US008027242B2

(12) United States Patent
Garudadri et al.

(10) Patent No.: US 8,027,242 B2
(45) **Date of Patent: *Sep. 27, 2011**

(54) SIGNAL CODING AND DECODING BASED ON SPECTRAL DYNAMICS

(75) Inventors: Harinath Garudadri, San Diego, CA (US); Naveen B. Srinivasamurthy, San Diego, CA (US); Petr Motlicek, Brno (CZ); Hynek Hermansky, Martigny (CH)

(73) Assignee: QUALCOMM Incorporated, San Diego, CA (US)

( * ) Notice: Subject to any disclaimer, the term of this patent is extended or adjusted under 35 U.S.C. 154(b) by 1144 days.

This patent is subject to a terminal disclaimer.

(21) Appl. No.: 11/583,537

(22) Filed: Oct. 18, 2006

(65) Prior Publication Data

US 2008/0031365 A1 Feb. 7, 2008

Related U.S. Application Data

(60) Provisional application No. 60/729,044, filed on Oct. 21, 2005.

(51) Int. Cl.
*H04J 9/00* (2006.01)

(52) U.S. Cl. ........................................................ 370/204

(58) Field of Classification Search .................. 370/204, 370/205, 206, 207, 208, 210, 212, 213, 215, 370/203, 389, 395.41, 395.6, 401, 395.61, 370/395.64, 201, 202; 704/229, 203, 217; 375/242

See application file for complete search history.

(56) References Cited

U.S. PATENT DOCUMENTS 4,184,049 A * 1/1980 Crochiere et al. ............ 704/229
5,838,268 A 11/1998 Frenkel
5,884,010 A 3/1999 Chen et al.
5,943,132 A 8/1999 Erskine
6,091,773 A 7/2000 Sydorenko
7,173,966 B2 2/2007 Miller
7,206,359 B2 4/2007 Kjeldsen et al.
7,430,257 B1 9/2008 Shattil
7,532,676 B2 5/2009 Fonseka et al.
7,639,921 B2 * 12/2009 Seo et al. ........................ 386/55

(Continued)

FOREIGN PATENT DOCUMENTS

EP 0782128 A1 7/1997

(Continued)

OTHER PUBLICATIONS

Herre J et al: "Enhancing the Performance of Perceptual Audio Coders by Using Temporal Noise Shaping (TNS)" Preprints of Papers Presented at The AES Convention, Nov. 8, 1996, pp. 1-24, XP002102636.

(Continued)

*Primary Examiner* — Chi H Pham
*Assistant Examiner* — Alexander Boakye
(74) *Attorney, Agent, or Firm* — Kam T. Tam; Espartaco Diaz Hidalgo

(57) ABSTRACT

In an apparatus and method, time-varying signals are processed and encoded via a frequency domain linear prediction (FDLP) scheme to arrive at an all-pole model. Residual signals resulted from the scheme are estimated. Quantized values of the all-pole model and the residual signals are packetized as encoded signals suitable for transmission or storage. To reconstruct the time-varying signals, the encoded signals are decoded. The decoding process is basically the reverse of the encoding process.

39 Claims, 8 Drawing Sheets

U.S. PATENT DOCUMENTS

| | | | | |
|---|---|---|---|---|
| 2009/0198500 | A1* | 8/2009 | Garudadri et al. | 704/500 |

FOREIGN PATENT DOCUMENTS

| | | | |
|---|---|---|---|
| EP | 0867862 | A2 | 9/1998 |
| EP | 1093113 | A2 | 4/2001 |
| JP | 62502572 | T | 10/1987 |
| JP | 6229234 | A | 8/1994 |
| JP | 7077979 | A | 3/1995 |
| JP | 7234697 | A | 9/1995 |
| JP | O8102945 | | 4/1996 |
| JP | 9258795 | | 10/1997 |
| JP | 2002032100 | A | 1/2002 |
| JP | 2003108196 | A | 4/2003 |
| JP | 2007506986 | T | 3/2007 |
| TW | 442776 | | 6/2001 |
| TW | 454169 | | 9/2001 |
| TW | 454171 | | 9/2001 |
| TW | 1242935 | | 11/2005 |
| WO | WO2005027094 | A1 | 3/2005 |
| WO | 2005096274 | | 10/2005 |

OTHER PUBLICATIONS

Motlicek et al: "Audio Coding Based on Long Temporal Contexts" IDIAP Research Report, [Online] Apr. 2006, XP002423396 Retrieved from the Internet:URL:http://www.idiap.ch/publications/motlicek-idiap-rr-06-30bib.abs.html>.

Motlicek et al: "Wide-Band Preceptual Audio Coding based on Frequency-Domain Linear Prediction" IDIAP Research Report, [Online] Oct. 2006, XP002423397 Retrieved from the Internet: URL:http://www.idiap.ch/publications/motlicek-idiap-rr-06-56.bib.abs.html>.

Athineos M et al: "Frequency-domain linear prediction for temporal features" Automatic Speech Recognition And Underrstanding, 2003, ASRU '03, 2003 IEEE Workshop on St. Thomas, VI, USA Nov. 30, 2003, pp. 261-266, XP010713319, ISBN: 0-7803-7980-2.

Schimmel S et al: "Coherent Envelope Detection for Modulation Filtering of Speech" Acoustics, Speech, and Signal Processing, 2005. Proceedings. (ICASSP '05). IEEE International Conference on Philadelphia, Pennsylvania, USA Mar. 18-23, 2005, Piscataway, NJ, USA, IEEE, pp. 221-224, XP010792014, ISBN: 0-7803-8874-7.

Kumaresan Ramdas et al: "Model-based approach to envelope and positive instantaneous frequency estimation of signals with speech applications" Journal of The Acoustical Society of America, AIP/Acoustical Society of America, Melville, NY, US, vol. 105, No. 3, Mar. 1999, pp. 1912-1924, XP021000860, ISSN: 0001-4966.

Athineos et al: "LP-TRAP: Linear predictive temporal patterns" PRC. of ICSLP, Oct. 2004, pp. 1154-1157, XP002423398.

International Search Report—PCT/US2006/060168—International Search Authority—European Patent Office—Mar. 19, 2007.

Written Opinion—PCT/US2006/060168—International Search Authority—European Patent Office—Mar. 19, 2007.

International Preliminary Report on Patentability—PCT/US2006/060168—International Search Authority—The International Bureau of WIPO—Geneva, Switzerland—Apr. 23, 2008.

Athineos, Marios et al., "Frequency-Domain Linear Prediction for Temporal Features". Proceeding of ASRU-2003, Nov. 30-Dec. 4, 2003, St. Thomas USVI.

Athineos, Marios et al., "PLP2 Autoregressive modeling of auditory-like 2-D spectro-temporal patterns", Proceeding from Workshop n Statistical and Perceptual Audio Processing, SAPA-2004, paper 129, Oct. 3, 2004, Jeju, Korea.

C. Loeffler, A. Ligtenberg, and G. S. Moschytz, "Algorithm-architecture mapping for custom DCT chips." in Proc. Int. Symp. Circuits Syst. (Helsinki, Finland), Jun. 1988, pp. 1953-1956.

Christensen, Mods Graesboll et al., "Computationally Efficient Amplitude Modulated Sinusoidal Audiocoding Using Frequency-Domain Linear Prediction", ICASSP 2006 Proceeding—Toulouse, France, IEEE Signal Processing Society, vol. 5, Issue, May 14-19, 2006 pp. V-V.

Ephraim Feig, "A fast scaled-DCT algorithm", SPIE vol. 1244, Image Processing Algorithms and Techniques (1990), pp. 2-13.

Fousek, Petr, "Doctoral Thesis: Extraction of Features for Automatic Recognition of Speech Based on Spectral Dynamics", Czech Technical University in Prague. Czech Republic, Mar. 2007.

Hermansky H., Fujisaki H., Sato Y., "Analysis and Synthesis of Speech Based on Spectral Transform Linear Predictive Method", in Proc. of ICASSP, vol. 8, pp. 777-780, Boston, USA, Apr. 1983.

Hermansky H, "Perceptual linear predictive (PLP) analysis for speech", J. Acoust. Soc. Am., vol. 87:4, pp. 1738-1752, 1990.

Herre, Jurgen, "Temporal Noise Shaping, Quantization and Coding Methods in Perceptual Audio Coding: A Tutorial Introduction", Proceedings of the AES 17th International Conference: High-Quality Audio Coding, Florence, Italy, Sep. 2-5, 1999.

ISO/IEC JTC1/SC29/WG11 N7335, "Call for Proposals on Fixed-Point 8x8 IDCT and DCT Standard," pp. 1-18, Poznan, Poland, Jul. 2005.

ISO/IEC JTC1/SC29/WG11 N7817 [23002-2 WD1] "Information technology—MPEG Video Technologies—Part 2: Fixed-point 8x8 IDCT and DCT transforms," Jan. 19, 2006, pp. 1-27.

ISO/IEC JTC1/SC29/WG11N7292 [11172-6 Study on FCD] Information Technology—Coding of Moving Pictures and Associated Audio for Digital Storage Media at up to About 1.5 Mbit/s—Part 6: Specification of Accuracy Requirements for Implementation of Integer Inverse Discrete Cosine Transform, IEEE standard 1180-1190, pp. 1-14, Approved Dec. 6, 1990.

J. Makhoul, "Linear Prediction: A Tutorial Review", in Proc. Of IEEE, vol. 63, No. 4, Apr. 1975. pp. 561-580.

Jan Skoglund et al: "On Time-Frequency Masking in Voiced Speech" IEEE Transactions On Speech And Audio Processing, IEEE Service Center, New York NY, US, vol. 8, No. 4, Jul. 1, 2000, XP011054031.

Jesteadt, Walt at al., °Forward Masking as a Function of Frequency, Masker Level and Signal Delay, J. Acoust. Soc. Am., 71(4), Apr. 1982, pp. 950-962.

Johnston J D: "Transform Coding of Audio Signals Using Perceptual Noise Criteria" IEEE Journal on Selected Areas I N Communications, IEEE Service Center, Piscataway, US, vol. 6, No. 2, Feb. 1, 1988, pp. 314-323, XP002003779.

M12984: Gary J. Sullivan, "On the project for a fixed-point IDCT and DCT standard", Jan. 2006, Bankok, Thailand.

M13004: Yuriy A. Reznik, Arianne T. Hinds, Honggang Qi, and Siwei Ma, "On Joint Implementation of Inverse Quantization and IDCT scaling", Jan. 2006, Bankok, Thailand.

M13005, Yuriy A. Reznik, "Considerations for choosing precision of MPEG fixed point 8x8 IDCT Standard" Jan. 2006, Bangkok, Thailand.

M13326: Yuriy a. Reznik and Arianne T. Hinds, "Proposed Core Experiment on Convergence of Scaled and Non-Scaled IDCT Architectures", Apr. 1, 2006, Montreux, Switzerland.

Marios Athineos & Daniel P.W. Ellis: "Autoregressive modeling of temporal envelopes", IEEE Transactions on Signal Processing IEEE Service Center, New York, NY, US-ISSN 1053-587X, Jun. 2007, pp. 1-9, XP002501759.

Mark. S. Vinton and Les. E. Atlas, "A Scalable and Progressive Audio Codec", IEEE ICASSP 2001, May 7-11, 2001, Salt Lake City.

Motlicek P., Hermansky H., Garudadri H., "Speech Coding Based on Spectral Dynamics", technical report IDIAP-RR 06-05, <http://www.idiap.ch>, Jan. 2006.

Motlicek, Petr at al.,'"Speech Coding Based on Spectral Dynamics", Lecture Notes in Computer Science, vol. 4188/2066. Springer/Berlin/Heidelberg, DE, Sep. 2006.

Motlicek, Petr et al., "Wide-Band Perceptual Audio Coding Based on Frequency-Domain Linear Prediction", Proceeding of ICASSP 2007, IEEE Signal Processing Society, Apr. 2007, pp. 1-265 -1-268.

N Derakhshan; MH Savoji. Perceptual Speech Enhancement Using a Hilbert Transform Based Time-Frequency Representation of Speech. SPECOM Jun. 25-29, 2006.

Qin Li; Atlas, L.;, "Properties for modulation spectral filtering," Acoustics, Speech, and Signal Processing, 2005. Proceedings. (ICASSP '05). IEEE International Conference on, vol. 4, No., pp. iv/521-iv/524 vol. 4, Mar. 18-23, 2005 doi: 10.1109/ICASSP.2005.1416060 URL:http://ieeexplore.ieee.org/stamp/stamp.jsp?tp=&arnumber=I416060&isnumber=3065.

Sinaga F et al: "Wavelet packet based audio coding using temporal masking" Information, Communications and Signal Processing, 2003 and Fourth Pacific Rim Conference on Multimedia. Proceedings of the 2003 Joint Confe Rence of the Fourth International Conference on Singapore Dec. 15-18, 2003, Piscataway, NJ, USA, IEEE, vol. 3, Dec. 15, 2003, pp. 1380-1383, XP010702139.

Spanias A. S., "Speech Coding: A Tutorial Review", In Proc. of IEEE, vol. 82, No. 10, Oct. 1994.

Sriram Ganapathy et al: "Temporal masking for bit-rate reduction in audio codec based on Frequency Domain Linear Prediction" Acoustics, Speech and Signal Processing, 2008. ICASSP 2008. IEEE International Conference on, IEEE, Piscataway, NJ, USA, Mar. 31, 2008, pp. 4781-4784, XP031251668.

W. Chen, C.H. Smith and S.C. Fralick, "A Fast Computational Algorithm for the Discrete Cosine Transform", IEEE Transactions on Communications, vol. com-25, No. 9, pp. 1004-1009, Sep. 1977.

Y. Arai, T. Agui, and M. Nakajima, "A Fast DCT-SQ Scheme for Images", Transactions of the IEICE vol. E 71, No. 11 Nov. 1988, pp. 1095-1097.

* cited by examiner

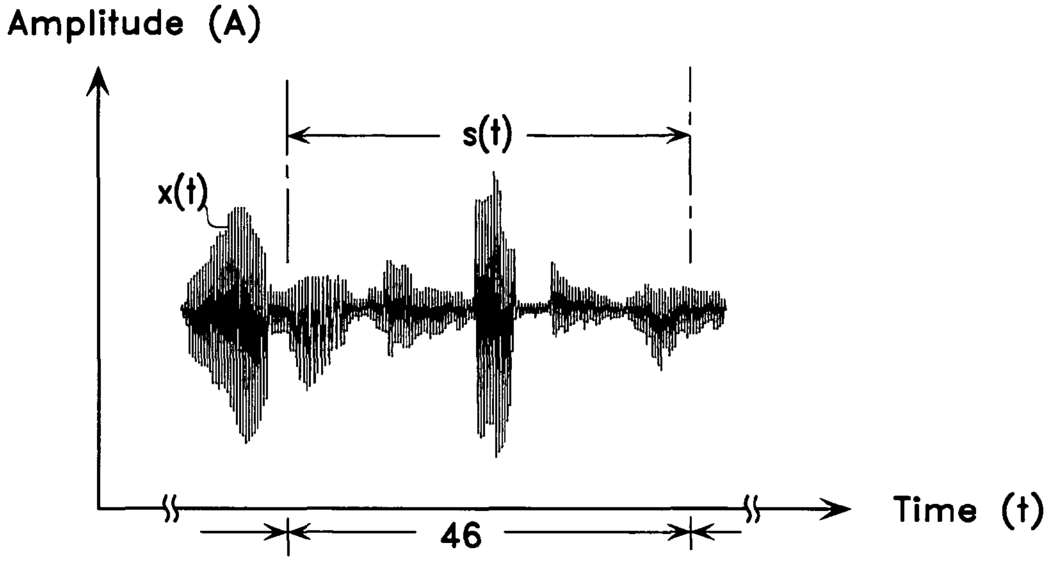
FIG. 4
FIG. 5
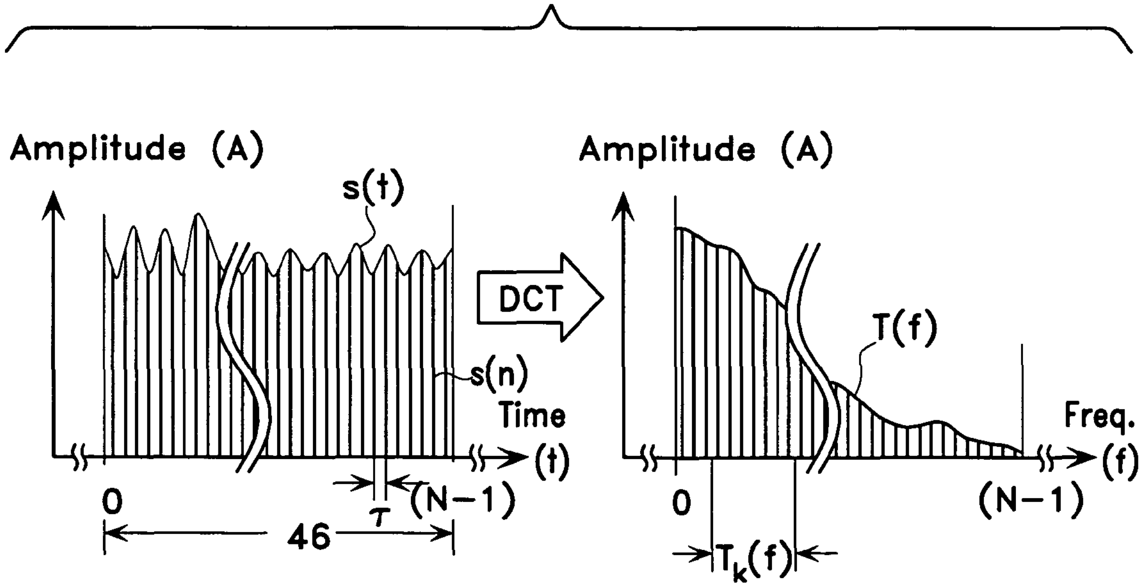

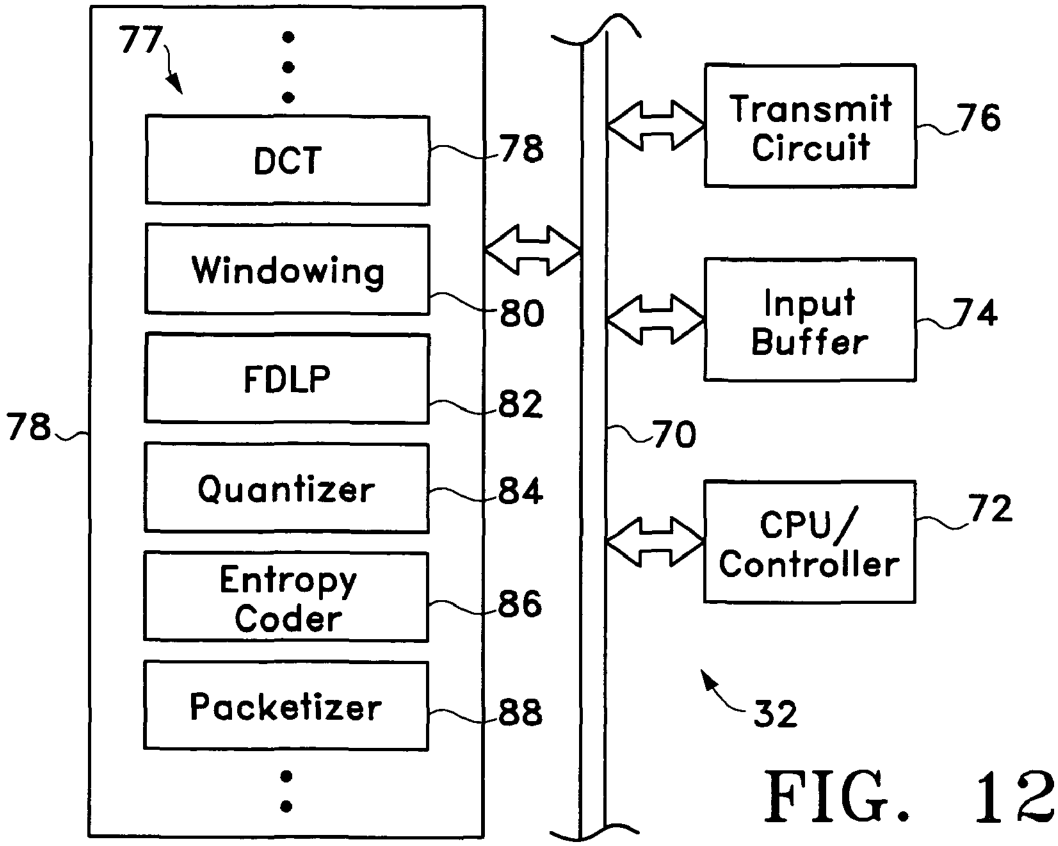
FIG. 12
FIG. 13
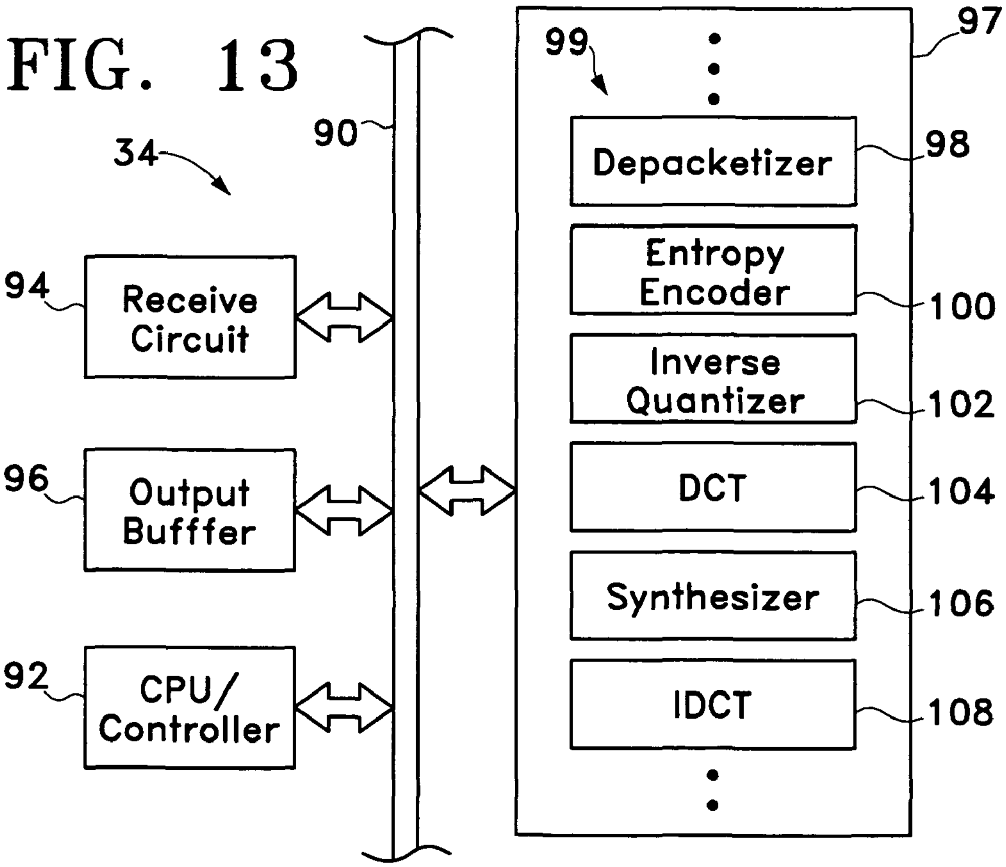

SIGNAL CODING AND DECODING BASED ON SPECTRAL DYNAMICS

CLAIM OF PRIORITY UNDER 35 U.S.C §119

The present application for patent claims priority to U.S. Provisional Application No. 60/729,044, entitled "Signal Coding and Decoding Based on Spectral Dynamics," filed on Oct. 21, 2005, and assigned to the assignee hereof and expressly incorporated by reference herein.

BACKGROUND

I. Field

The present invention generally relates to signal processing, and more particularly, to encoding and decoding of signals for storage and retrieval or for communications.

II. Background

In digital telecommunications, signals need to be coded for transmission and decoded for reception. Coding of signals concerns with converting the original signals into a format suitable for propagation over the transmission medium. The objective is to preserve the quality of the original signals but at a low consumption of the medium's bandwidth. Decoding of signals involves the reverse of the coding process.

A known coding scheme uses the technique of pulse-code modulation (PCM). Referring to FIG. 1 which shows a time-varying signal x(t) that can be a segment of a speech signal, for instance. The y-axis and the x-axis represent the amplitude and time, respectively. The analog signal x(t) is sampled by a plurality of pulses 20. Each pulse 20 has an amplitude representing the signal x(t) at a particular time. The amplitude of each of the pulses 20 can thereafter be coded in a digital value for later transmission, for example.

To conserve bandwidth, the digital values of the PCM pulses 20 can be compressed using a logarithmic companding process prior to transmission. At the receiving end, the receiver merely performs the reverse of the coding process mentioned above to recover an approximate version of the original time-varying signal x(t). Apparatuses employing the aforementioned scheme are commonly called the a-law or μ-law codecs.

As the number of users increases, there is a further practical need for bandwidth conservation. For instance, in a wireless communication system, a multiplicity of users can be sharing a finite frequency spectrum. Each user is normally allocated a limited bandwidth among other users.

In the past decade or so, considerable progress has been made in the development of speech coders. A commonly adopted technique employs the method of code excited linear prediction (CELP). Details of CELP methodology can be found in publications, entitled "Digital Processing of Speech Signals," by Rabiner and Schafer, Prentice Hall, ISBN: 0132136031, September 1978; and entitled "Discrete-Time Processing of Speech Signals," by Deller, Proakis and Hansen, Wiley-IEEE Press, ISBN: 0780353862, September 1999. The basic principles underlying the CELP method is briefly described below.

Reference is now returned to FIG. 1. Using the CELP method, instead of digitally coding and transmitting each PCM sample 20 individually, the PCM samples 20 are coded and transmitted in groups. For instance, the PCM pulses 20 of the time-varying signal x(t) in FIG. 1 are first partitioned into a plurality of frames 22. Each frame 22 is of a fixed time duration, for instance 20 ms. The PCM samples 20 within each frame 22 is collectively coded via the CELP scheme and thereafter transmitted. Exemplary frames of the sampled pulses are PCM pulse groups 22A-22C shown in FIG. 1.

For simplicity, take only the three PCM pulse groups 22A-22C for illustration. During encoding prior to transmission, the digital values of the PCM pulse groups 22A-22C are consecutively fed to a linear predictor (LP) module. The resultant output is a set of frequency values, also called a "LP filter" or simply "filter" which basically represents the spectral content of the pulse groups 22A-22C. The LP filter is then quantized.

The LP module generates an approximation of the spectral representation of the PCM pulse groups 22A-22C. As such, during the predicting process, errors or residual values are introduced. The residual values are mapped to a codebook which carries entries of various combinations available for close matching of the coded digital values of the PCM pulse groups 22A-22C. The best fitted values in the codebook are mapped. The mapped values are the values to be transmitted. The overall process is called time-domain linear prediction (TDLP).

Thus, using the CELP method in telecommunications, the encoder (not shown) merely has to generate the LP filters and the mapped codebook values. The transmitter needs only to transmit the LP filters and the mapped codebook values, instead of the individually coded PCM pulse values as in the a- and μ-law encoders mentioned above. Consequently, substantial amount of communication channel bandwidth can be saved.

On the receiver end, it also has a codebook similar to that in the transmitter. The decoder (not shown) in the receiver, relying on the same codebook, merely has to reverse the encoding process as aforementioned. Along with the received LP filters, the time-varying signal x(t) can be recovered.

Heretofore, many of the known speech coding schemes, such as the CELP scheme mentioned above, are based on the assumption that the signals being coded are short-time stationary. That is, the schemes are based on the premise that frequency contents of the coded frames are stationary and can be approximated by simple (all-pole) filters and some input representation in exciting the filters. The various TDLP algorithms in arriving at the codebooks as mentioned above are based on such a model. Nevertheless, voice patterns among individuals can be very different. Non-human audio signals, such as sounds emanated from various musical instruments, are also distinguishably different from that of the human counterparts. Furthermore, in the CELP process as described above, to expedite real-time signal processing, a short time frame is normally chosen. More specifically, as shown in FIG. 1, to reduce algorithmic delays in the mapping of the values of the PCM pulse groups, such as 22A-22C, to the corresponding entries of vectors in the codebook, a short time window 22 is defined, for example 20 ms as shown in FIG. 1. However, derived spectral or formant information from each frame is mostly common and can be shared among other frames. Consequently, the formant information is more or less repetitively sent through the communication channels, in a manner not in the best interest for bandwidth conservation.

Accordingly, there is a need to provide a coding and decoding scheme with improved preservation of signal quality, applicable not only to human speeches but also to a variety of other sounds, and further for efficient utilization of channel resources.

SUMMARY

In an apparatus and method, a time-varying signal is partitioned into frames and each frame is encoded via a frequency domain linear prediction (FDLP) scheme to arrive at an all-pole model carrying spectral information of the signal in multiple sub-bands. A residual signal resulted from the scheme is estimated in the multiple sub-bands. Quantized values of all the sub-bands in all the frames of the all-pole model and the residual signal are packetized as encoded signals suitable for transmission or storage. To reconstruct the time-varying signal, the encoded signal is decoded. The decoding process is in essence the reverse of the encoding process.

The partitioned frames can be chosen to be relatively long in duration resulting in more efficient use of format or common spectral information of the signal source. The apparatus and method implemented as described are suitable for use not only to vocalic voices but also for other sounds, such as sounds emanated from various musical instruments, or combination thereof.

These and other features and advantages will be apparent to those skilled in the art from the following detailed description, taken together with the accompanying drawings, in which like reference numerals refer to like parts.

BRIEF DESCRIPTION OF THE DRAWINGS

FIG. 4 is a graphical representation of a time-varying signal partitioned into a plurality of frames;

FIG. 5 is a graphical representation of a frequency-domain transform of a frame of the time-domain signal of FIG. 4;

FIG. 12 is a schematic drawing of a part of the circuitry of an encoder in accordance with the exemplary embodiment; and FIG. 13 is a schematic drawing of a part of the circuitry of an decoder in accordance with the exemplary embodiment.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 1:
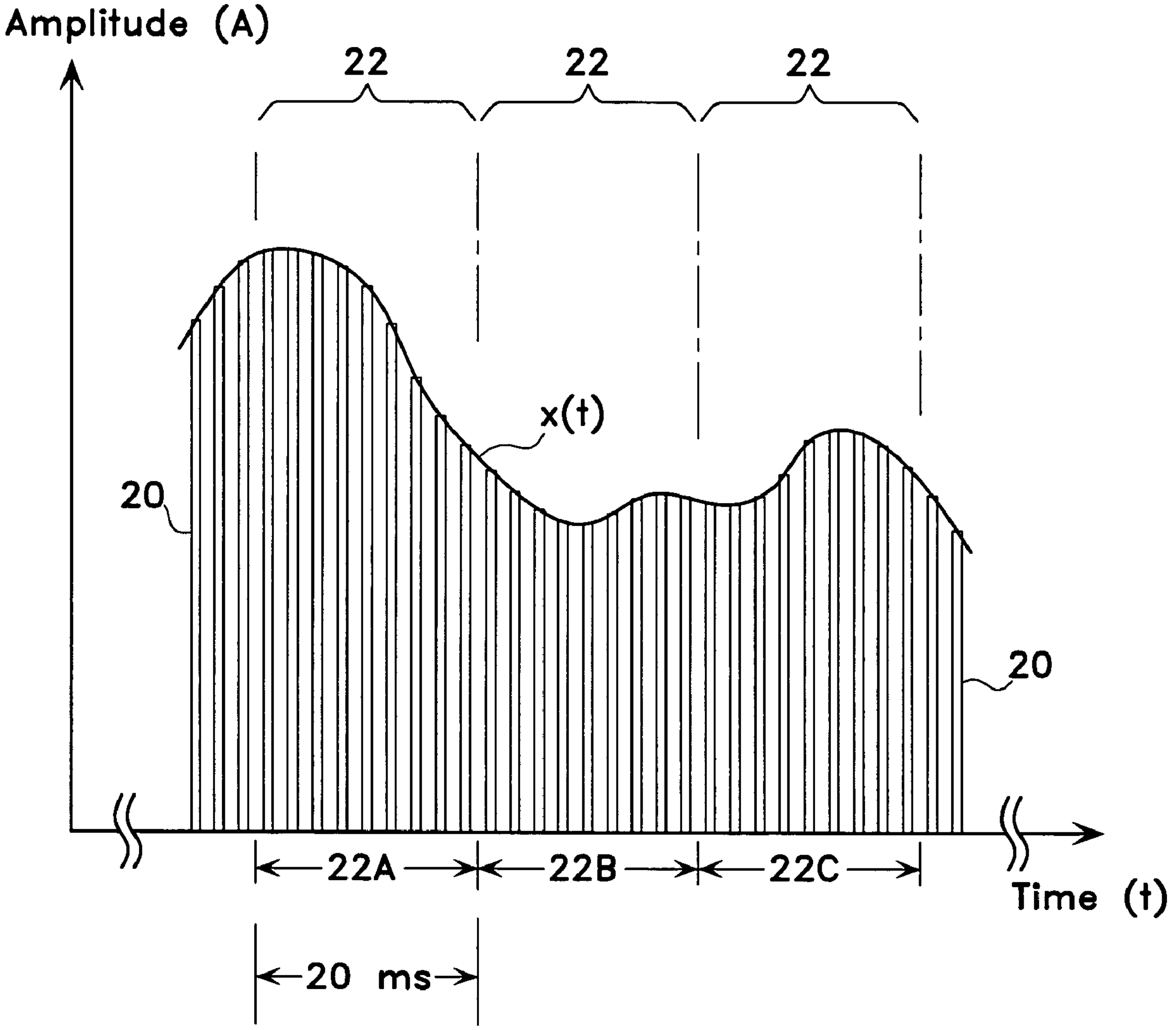
FIG. 1 shows a graphical representation of a time-varying signal sampled into a discrete signal.
Figure 2:
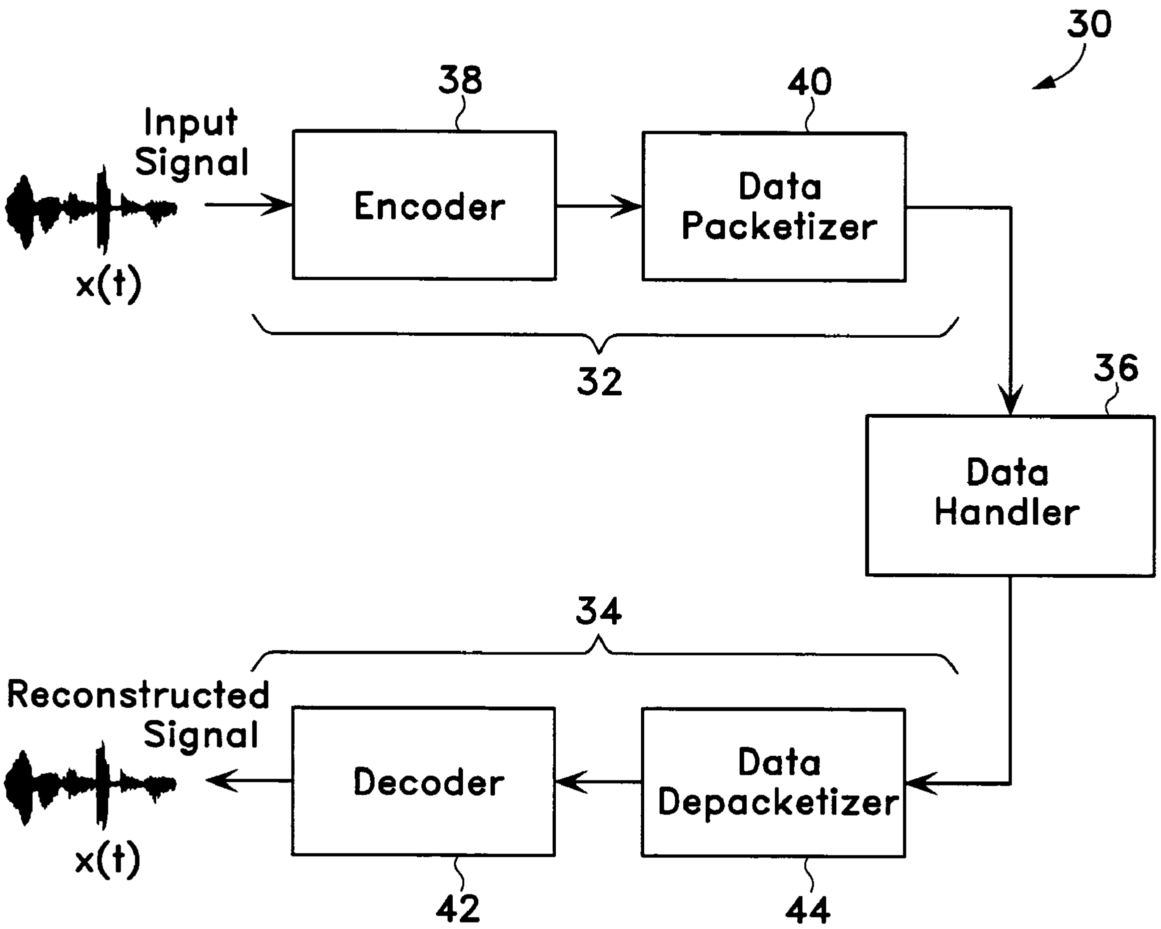
FIG. 2 is a general schematic diagram showing the hardware implementation of the exemplified embodiment of the invention.

FIG. 2 is a general schematic diagram of hardware for implementing the exemplified embodiment of the invention. The system is overall signified by the reference numeral 30. The system 30 can be approximately divided into an encoding section 32 and a decoding section 34. Disposed between the sections 32 and 34 is a data handler 36. Examples of the data handler 36 can be a data storage device or a communication channel.

In the encoding section 32, there is an encoder 38 connected to a data packetizer 40. A time-varying input signal x(t), after passing through the encoder 38 and the data packetizer 40 are directed to the data handler 36.

In a somewhat similar manner but in the reverse order, in the decoding section 34, there is a decoder 42 tied to a data depacketizer 44. Data from the data handler 36 are fed to the data depacketizer 44 which in turn sends the depacketized data to the decoder 42 for the reconstruction of the original time-varying signal x(t).

Figure 3:
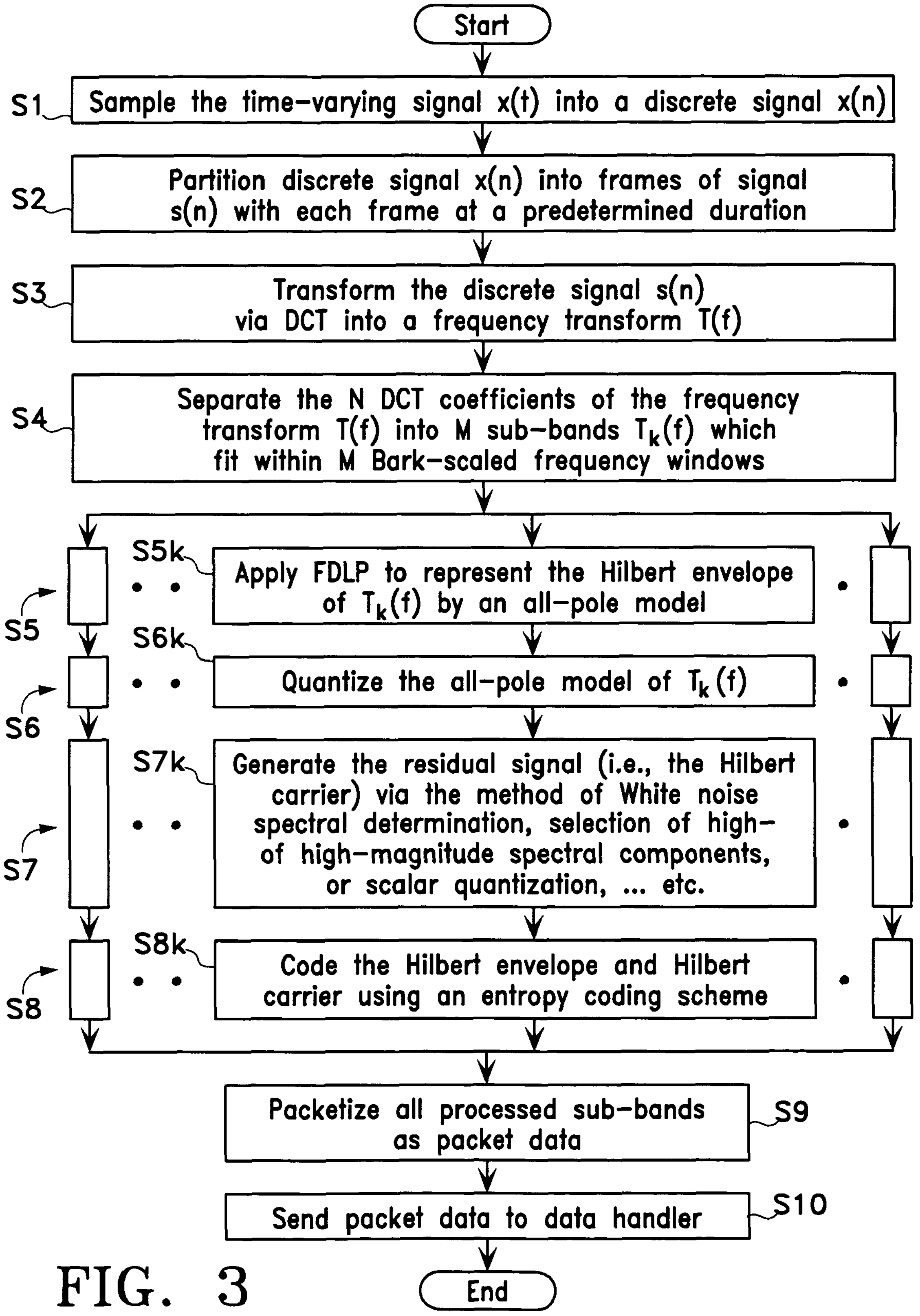
FIG. 3 is flowchart illustrating the steps involved in the encoding process of the exemplified embodiment.

FIG. 3 is a flow diagram illustrating the steps of processing involved in the encoding section 32 of the system 30 shown in FIG. 2. In the following description, FIG. 3 is referred to in conjunction with FIGS. 4-10.

In step S1 of FIG. 3, the time-varying signal x(t) is first sampled, for example, via the process of pulse-code modulation (PCM). The discrete version of the signal x(t) is represented by x(n). In FIG. 4, only the continuous signal x(t) is shown. For the sake of clarity so as not to obscure FIG. 4, the multiplicity of discrete pulses of x(n) are not shown.

In this specification and the appended claims, unless specifically specified wherever appropriate, the term "signal" is broadly construed. Thus the term signal includes continuous and discrete signals, and further frequency-domain and time-domain signals. Moreover, hereinbelow, lower-case symbols denote time-domain signals and upper-case symbols denote frequency-transformed signals. The rest of the notation will be introduced in subsequent description.

Progressing into step S2, the sampled signal x(n) is partitioned into a plurality of frames. One of such frame is signified by the reference numeral 46 as shown in FIG. 4. In the exemplary embodiment, the time duration for the frame 46 is chosen to be 1 second.

The time-varying signal within the selected frame 46 is labeled s(t) in FIG. 4. The continuous signal s(t) is highlighted and duplicated in FIG. 5. It should be noted that the signal segment s(t) shown in FIG. 5 has a much elongated time scale compared with the same signal segment s(t) as illustrated in FIG. 4. That is, the time scale of the x-axis in FIG. 5 is significantly stretched apart in comparison with the corresponding x-axis scale of FIG. 4.

The discrete version of the signal s(t) is represented by s(n), where n is an integer indexing the sample number. The time-continuous signal s(t) is related to the discrete signal s(n) by the following algebraic expression:

$$s(t)=s(n\tau) \tag{1}$$

where $\tau$ is the sampling period as shown in FIG. 5.

Progressing into step S3 of FIG. 3, the sampled signal s(n) undergoes a frequency transform. In this embodiment, the method of discrete cosine transform (DCT) is employed. Hereinbelow, in this specification and the appended claims, the term "frequency transform" and "frequency-domain transform" are used interchangeably. Likewise, the term "time transform" and "time-domain transform" are used interchangeably. Mathematically, the transform of the discrete signal s(n) from the time domain into the frequency domain can be expressed as follows:

$$T(f) = c(f)\sum_{n=0}^{N-1} s(n)\cos\frac{\pi(2n+1)f}{2N} \quad (2)$$

where s(n) is as defined above, f is the discrete frequency in which 0≦f≦N, T is the linear array of the N transformed values of the N pulses of s(n), and the coefficients c are given by $c(0)=\sqrt{1/N}$, $c(f)=\sqrt{2/N}$ for 1≦f≦N−1.

The DCT of the time-domain parameter of s(n) into the frequency-domain parameter T(f) is diagrammatically shown in FIG. 5. The N pulsed samples of the frequency-domain transform T(f) in this embodiment are called DCT coefficients.

Figure 6:
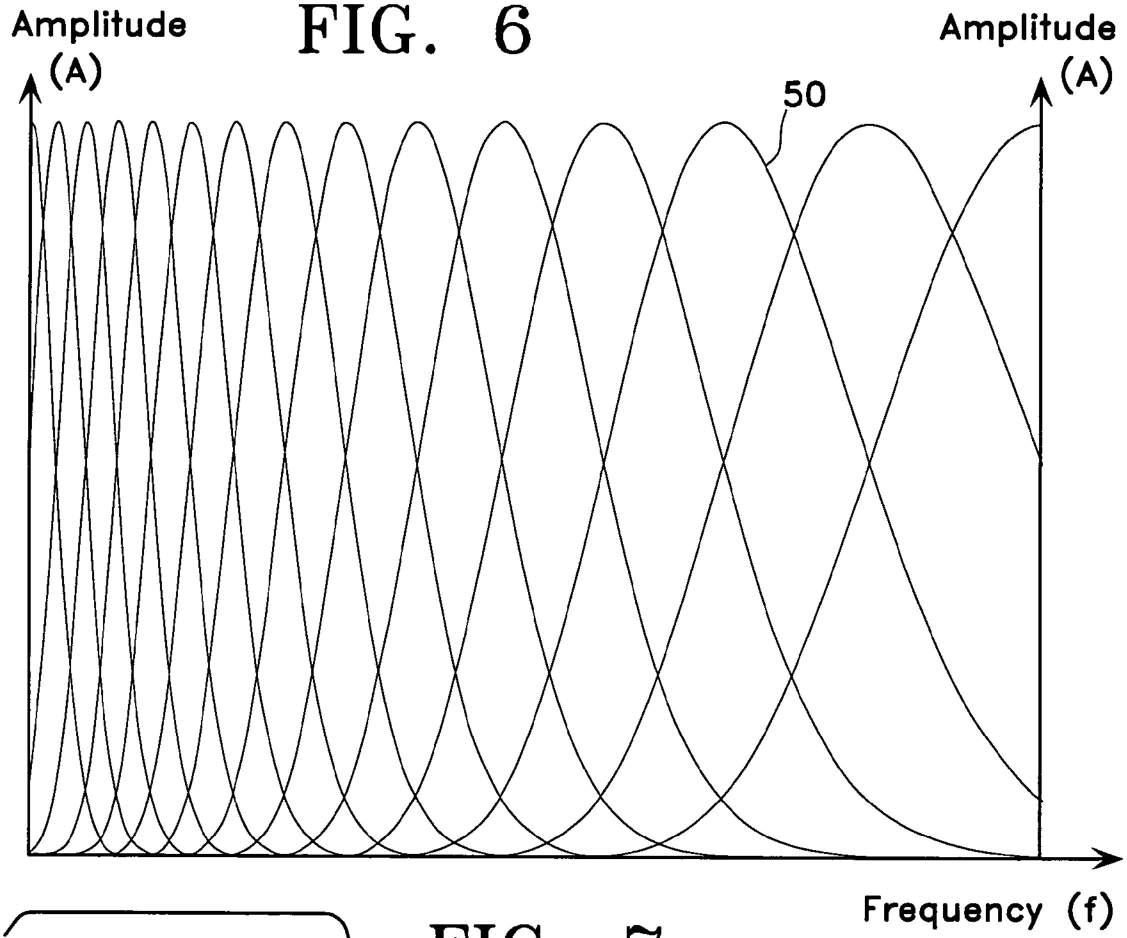
FIG. 6 is a graphical representation of a plurality of overlapping Gaussian windows for sorting the transformed data for a plurality of sub-bands.

Entering into step S4 in FIG. 3, the N DCT coefficients of the DCT transform T(f) are sorted and thereafter fitted into a plurality of frequency sub-band windows. The relative arrangement of the sub-band windows is shown in FIG. 6. Each sub-band window, such as the sub-band window 50, is represented as a variable-size window. In the exemplary embodiment, Gaussian distributions are employed to represent the sub-bands. As illustrated, the medians of the sub-band windows are not linearly spaced. Rather, the windows are separated according to a Bark scale, that is, a scale implemented according to certain known properties of human perceptions. Specifically, the sub-band windows are narrower at the low-frequency end than at the high-frequency end. Such an arrangement is based on the finding that the sensory physiology of the mammalian auditory system is more attuned to the narrower frequency ranges at the low end than the wider frequency ranges at the high end of the audio frequency spectrum.

In selecting the number of sub-bands M, there should be a balance between complexity and signal quality. That is, if a higher quality of the encoded signal is desired, more sub-bands can be chosen but at the expense of more packetized data bits and further a more complex dealing of the residual signal, both will be explained later. On the other hand, fewer numbers of sub-bands may be selected for the sake of simplicity but may result in the encoded signal with relatively lower quality. Furthermore, the number of sub-bands can be chosen as dependent on the sampling frequency. For instance, when the sampling frequency is at 16,000 Hz, M can be selected to be 15. In the exemplary embodiment, the sampling frequency is chosen to be 8,000 Hz and with M set at 13 (i.e., M=13).

The N DCT coefficients are separated and fitted into the M sub-bands in the form of M overlapping Gaussian windows, as shown in FIG. 6.

The separated DCT coefficients in each sub-bands need to be further processed. The encoding process now enters into steps S5-S8 of FIG. 3. In this embodiment, each of the steps S5-S8 includes processing M sets of sub-steps in parallel. That is, the processing of the M sets of sub-steps is more or less carried out simultaneously. Hereinbelow, for the sake of clarity and conciseness, only the set involving the sub-steps S5*k*-S8*k* for dealing with the $k^{th}$ sub-band is described. It should be noted that processing of other sub-band sets is substantially similar.

In the following description of the embodiment, M=13 and 1≦k≦M in which k is an integer. In addition, the DCT coefficients sorted in the $k^{th}$ sub-band is denoted $T_k(f)$, which is a frequency-domain term. The DCT coefficients in the $k^{th}$ sub-band $T_k(f)$ has its time-domain counterpart, which is expressed as $s_k(n)$.

At this juncture, it helps to make a digression to define and distinguish the various frequency-domain and time-domain terms.

The time-domain signal in the $k^{th}$ sub-band $s_k(n)$ can be obtained by an inverse discrete cosine transform (IDCT) of its corresponding frequency counterpart $T_k(f)$. Mathematically, it is expressed as follows:

$$s_k(n) = \sum_{f=0}^{N-1} c(f)T_k(f)\cos\frac{\pi(2n+1)f}{2N} \quad (3)$$

where $s_k(n)$ and $T_k(f)$ are as defined above. Again, f is the discrete frequency in which 0≦f≦N and the coefficients c are given by $c(0)=\sqrt{1/N}$, $c(f)=\sqrt{2/N}$ for 1≦f≦N−1.

Switching the discussion from the frequency domain to the time domain, the time-domain signal in the $k^{th}$ sub-band $s_k(n)$ essentially composes of two parts, namely, the time-domain Hilbert envelope $\tilde{s}_k(n)$ and the Hilbert carrier $c_k(n)$, as shown in the right side of FIG. 7 and will be described further later. Stated in another way, modulating the Hilbert carrier $c_k(n)$ with the Hilbert envelope $\tilde{s}_k(n)$ will result in the time-domain signal in the $k^{th}$ sub-band $s_k(n)$. Algebraically, it can be expressed as follows:

$$s_k(n)=\tilde{s}_k(n)c_k(n) \quad (4)$$

Thus, from equation (4), if the time-domain Hilbert envelope $\tilde{s}_k(n)$ and the Hilbert carrier $c_k(n)$ are known, the time-domain signal in the $k^{th}$ sub-band $s_k(n)$ can be reconstructed. The reconstructed signal approximates that of a lossless reconstruction. The relationship is somewhat diagrammatically shown in FIG. 7. On the frequency-domain side to the left of FIG. 7, the DCT coefficients in the $k^{th}$ sub-band of the frequency transform $T_k(f)$ are signified by the reference numeral 28. On the time-domain side to the right of FIG. 7, the Hilbert envelope $\tilde{s}_k(n)$ is designated by the reference numeral 52, and the time-domain signal $s_k(n)$ is signified by the reference numeral 54.

Returning now to FIG. 3, sub-steps S5*k*-S7*k* basically concern with determining the Hilbert envelope $\tilde{s}_k(n)$ and the Hilbert carrier $c_k(n)$. Specifically, sub-steps S5*k* and S6*k* deal with calculating the Hilbert envelope $\tilde{s}_k(n)$, and sub-step S7*k* relates to estimating the Hilbert carrier $c_k(n)$.

As mentioned earlier, the time-domain term Hilbert envelope $\tilde{s}_k(n)$ in the $k^{th}$ sub-band can be derived from the corresponding frequency-domain parameter $T_k(f)$. However, in sub-step S5*k*, instead of using the IDCT process for the exact transformation of the parameter $T_k(f)$, the process of frequency-domain linear prediction (FDLP) of the parameter $T_k(f)$ is employed in the exemplary embodiment. Data resulted from the FDLP process can be more streamlined, and consequently more suitable for transmission or storage.

In the following paragraphs, the FDLP process is briefly described followed with a more detailed explanation.

Figure 7:
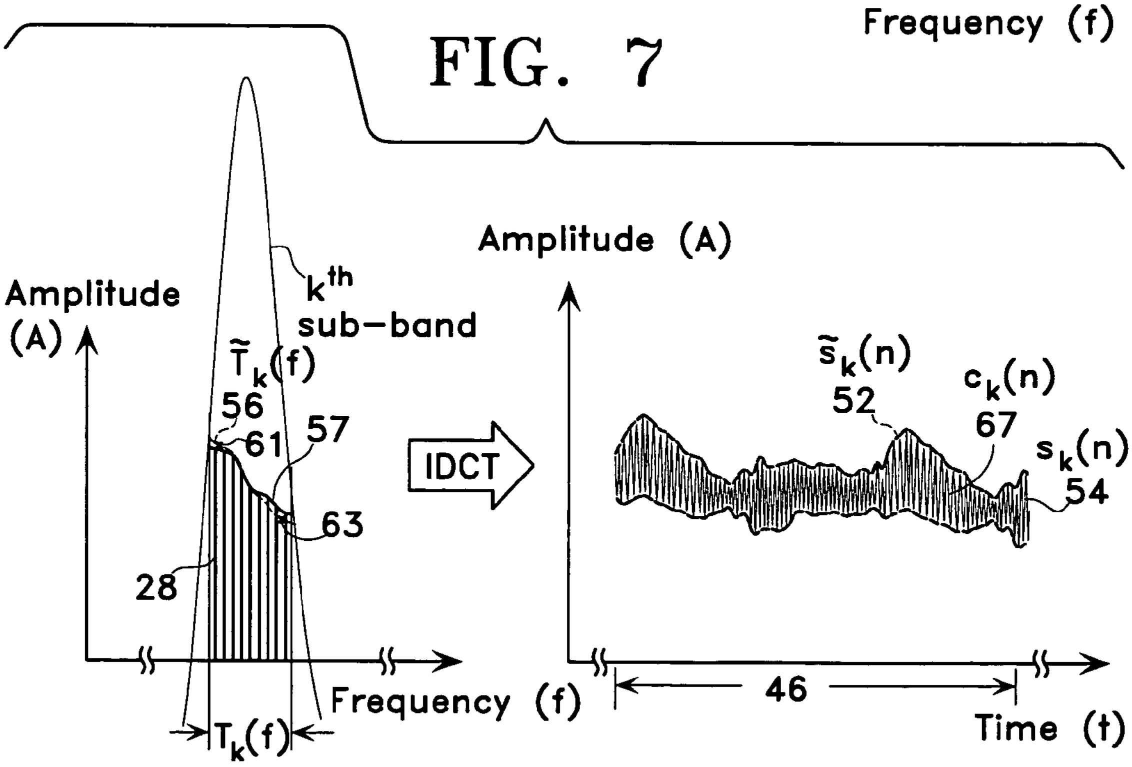
FIG. 7 is a graphical representation showing the frequency-domain and time-domain relationship of the transformed data in the $k^{th}$ sub-band.

Briefly stated, in the FDLP process, the frequency-domain counterpart of the Hilbert envelope $\tilde{s}_k(n)$ is estimated, which counterpart is algebraically expressed as $\tilde{T}_k(f)$ and is shown in ghost line and labeled 56 in FIG. 7. However, the signal intended to be encoded is $s_k(n)$. The frequency-domain counterpart of the parameter $s_k(n)$ is $T_k(f)$ which is shown in solid line and labeled 57 in FIG. 7. As will be described below, since the parameter $\tilde{T}_k(f)$ is an approximation, the difference between the approximated value $\tilde{T}_k(f)$ and the actual value $T_k(f)$ can also be estimated, which difference is expressed as $C_k(f)$. The parameter $C_k(f)$ is called the frequency-domain Hilbert carrier, and is also sometimes called the residual value.

Hereinbelow, further details of the FDLP process and the estimating of the parameter $C_k(f)$ are described.

In the FDLP process, the algorithm of Levinson-Durbin can be employed. Mathematically, the parameters to be estimated by the Levinson-Durbin algorithm can be expressed as follows:

$$H(z) = \frac{1}{1 + \sum_{i=0}^{K-1} a(i) z^{-k}} \qquad (5)$$

in which H(z) is a transfer function in the z-domain; z is a complex variable in the z-domain; a(i) is the $i^{th}$ coefficient of the all-pole model which approximates the frequency-domain counterpart $\tilde{T}_k(f)$ of the Hilbert envelope $\tilde{s}_k(n)$; i=0, . . . , K−1; The time-domain Hilbert envelope $\tilde{s}_k(n)$ has been described above (e.g., see FIG. 7).

Fundamentals of the Z-transform in the z-domain can be found in a publication, entitled "Discrete-Time Signal Processing," $2^{nd}$ Edition, by Alan V. Oppenheim, Ronald W. Schafer, John R. Buck, Prentice Hall, ISBN: 0137549202, and is not further elaborated in here.

In equation (5), the value of K can be selected based on the length of the frame 46 (FIG. 4). In the exemplary embodiment, K is chosen to be 20 with the time duration of the frame 46 set at 1 sec.

Figure 8:
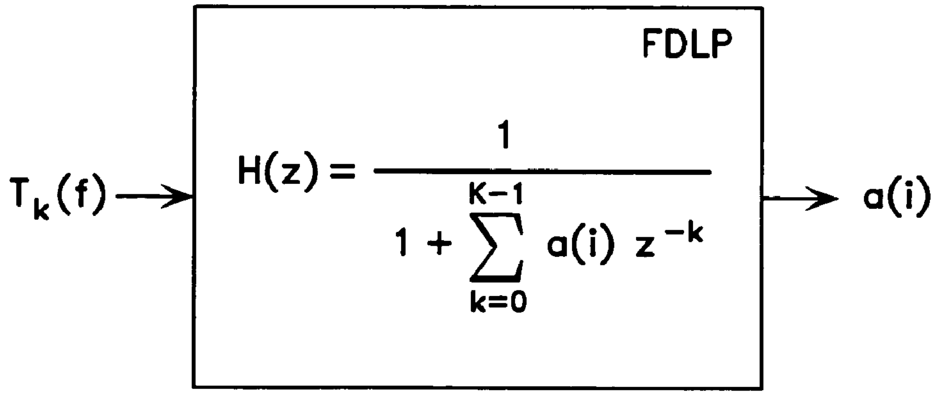
FIG. 8 is a graphical representation showing the frequency-domain linear prediction process.

In essence, in the FDLP process as exemplified by Equation (5), the DCT coefficients of the frequency-domain transform in the $k^{th}$ sub-band $T_k(f)$ are processed via the Levinson-Durbin algorithm resulting in a set of coefficients a(i), where 0<i<K−1, of the frequency counterpart $\tilde{T}_k(f)$ of the time-domain Hilbert envelope $\tilde{s}_k(n)$. Diagrammatically, the FDLP process is shown in FIG. 8.

The Levinson-Durbin algorithm is well known in the art and is not repeated in here. The fundamentals of the algorithm can be found in a publication, entitled "Digital Processing of Speech Signals," by Rabiner and Schafer, Prentice Hall, ISBN: 0132136031, September 1978.

Advancing into sub-step S6*k* in FIG. 3, the resultant coefficients a(i) are quantized. That is, for each value a(i), a close fit is matched to a codebook (not shown) to arrive at an approximate value. The process is called lossy approximation. During quantization, either the entire vector of a(i), where i=0 to i=K−1, can be quantized, or alternatively, the whole vector can be segmented and quantized separately. Again, the quantization process via codebook mapping is also well known and is not further elaborated.

The result of the FDLP process is the parameter $\tilde{T}_k(f)$, the Hilbert envelope expressed in the frequency domain, and is diagrammatically shown in FIG. 7 as the ghost line identified by the reference numeral 56. The quantized coefficients a(i) of the parameter $\tilde{T}_k(f)$ can also be graphically displayed in FIG. 7. Two of which are labeled 61 and 63 riding on the ghost line 56 which represents the parameter $\tilde{T}_k(f)$.

The quantized coefficients a(i), ), where i=0 to K−1, of the parameter $\tilde{T}_k(f)$ will be part of the encoded information sent to the data handler 36 (FIG. 2).

As mentioned above and repeated in here, since the parameter $\tilde{T}_k(f)$ is a lossy approximation of the original parameter $T_k(f)$, the difference of the two parameters is called the residual value, which is algebraically expressed as $C_k(f)$. Differently put, in the fitting process in sub-steps S5*k* and S6*k* via the Levinson-Durbin algorithm as aforementioned to arrive at the all-pole model, some information about the original signal cannot be captured. If signal encoding of high quality is intended, that is, if a lossless encoding is desired, the residual value $C_k(f)$ needs to be estimated. The residual value $C_k(f)$ basically comprises the frequency components of the carrier frequency $c_k(n)$ of the signal $s_k(n)$ and will be further be explained.

Estimation of the residual value is carried out in sub-step S7*k* of FIG. 3.

There are several approaches in estimating the Hilbert carrier $c_k(n)$.

A straightforward approach is to assume the Hilbert carrier $c_k(n)$ is mostly composed of White noise. One way to obtain the White noise information is to band-pass filtering the original signal x(t) (FIG. 4). In the filtering process, major frequency components of the White noise can be identified.

Figure 9:
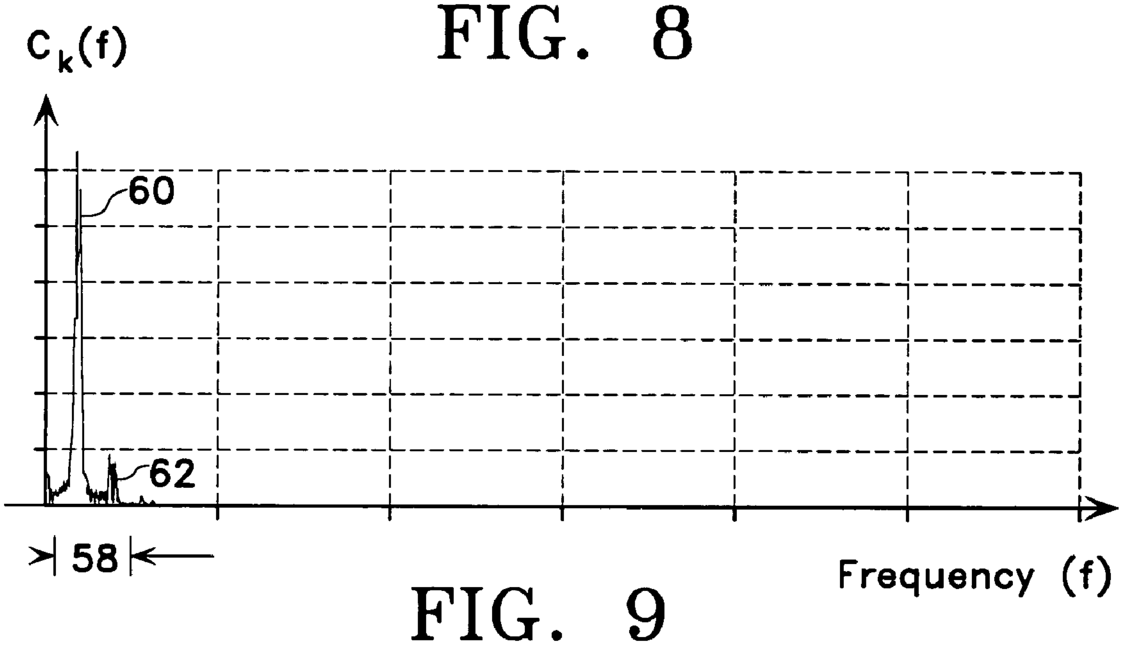
FIG. 9 is a graphical representation showing an exemplary spectral content of the signal carrier of a typical voiced signal.
Figure 10:
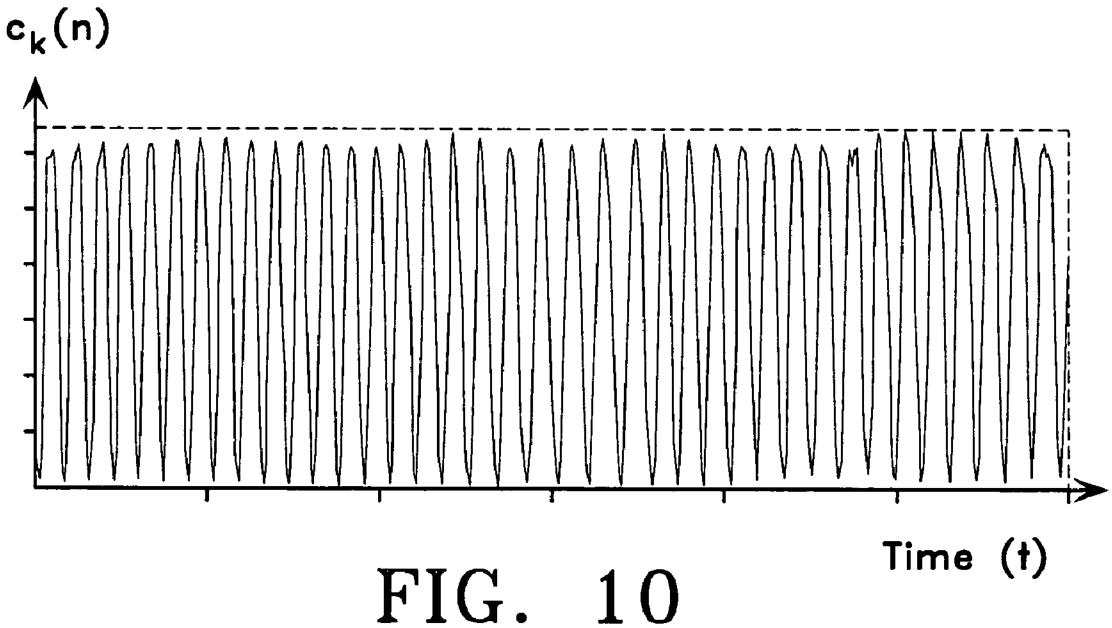
FIG. 10 is the time-domain version of the signal carrier of FIG. 9.

If the original signal x(t) (FIG. 4) is a voiced signal, that is, a vocalic speech segment originated from a human, it is found that the Hilbert carrier $c_k(n)$ can be quite predictable with only few frequency components. This is especially true if the sub-band window 50 (FIG. 6) is located at the low frequency end, that is, k is relatively low in value. FIG. 9 shows an exemplary spectral representation of the Hilbert carrier $c_k(n)$ of a typical voiced signal. That is, the parameter $C_k(f)$, having quite a narrow frequency band, identified by the approximate bandwidth 58 as shown in FIG. 9. The parameter $C_k(f)$, when expressed in the time domain, is in fact is the Hilbert carrier $c_k(n)$ and is shown in FIG. 10. It should noted in both FIGS. 9 and 10, what is shown is actually the time-continuous version $c_k(t)$ of the discrete parameter $c_k(n)$; the same holds true with the parameter $C_k(f)$. This is because displaying the multiplicity of discrete components would obscure the clarity of drawing figures.

As shown in FIG. 10, the Hilbert carrier $c_k(n)$ is quite regular and can be expressed with only few sinusoidal frequency components. For a reasonably high quality encoding, only the strongest components can selected. For example, using the "peak picking" method, the sinusoidal frequency components around the peaks 60 and 62 of FIG. 9 can be chosen as the components of the Hilbert carrier $c_k(n)$.

As another alternative in estimating the residual signal, each sub-band k (FIG. 6) can be assigned, a priori, a fundamental frequency component. By analyzing the spectral components of the Hilbert carrier $c_k(n)$, the fundamental frequency component or components of each sub-band can be estimated and used along with their multiple harmonics.

For a more faithful signal reconstruction irrespective of whether the original signal source is voiced or unvoiced, a combination of the above mentioned methods can be used. For instance, via simple thresholding on the Hilbert carrier in the frequency domain $C_k(f)$, it can be detected and determined whether the original signal segment s(t) (FIG. 5) is voiced or unvoiced. Thus, if the signal segment s(t) is determined to be voiced, the spectral estimation method as in describing FIGS. 9 and 10 can be used. One the other hand, if the signal segment s(t) is determined to be unvoiced, the White noise reconstruction method as aforementioned can be adopted.

There is yet another approach that can be used in the estimation of the Hilbert carrier $c_k(n)$. This approach involves the scalar quantization of the spectral components of the Hilbert carrier in the frequency domain $C_k(f)$ (FIG. 9). Here, after quantization, the magnitude and phase of the Hilbert carrier are represented by a lossy approximation such that the distortion introduced is minimized.

The Hilbert carrier data of either the parameter $C_k(f)$ or $c_k(n)$ will be another part of the encoded information eventually sent to the data handler 36 (FIG. 2).

Reference is now returned to FIG. 3. After the Hilbert envelope $\tilde{s}_k(n)$ and the Hilbert carrier $c_k(n)$ information are acquired from the $k^{th}$ sub-band as described above, the acquired information is coded via an entropy coding scheme as shown in step S8*k*.

Thereafter, all the data from each of the M sub-bands are concatenated and packetized, as shown in step S9 of FIG. 3. As needed, various algorithms well known in the art, including data compression and encryption, can be implemented in the packetization process. Thereafter, the packetized data can be sent to the data handler 36 (FIG. 2) as shown in step S10 of FIG. 3.

Data can be retrieved from the data handler 36 for decoding and reconstruction. Referring to FIG. 2, during decoding, the packetized data from the data handler 36 are sent to the depacketizer 44 and then undergo the decoding process by the decoder 42. The decoding process is substantially the reverse of the encoding process as described above. For the sake of clarity, the decoding process is not elaborated but summarized in the flow chart of FIG. 11.

During transmission, if data in few of the M frequency sub-bands are corrupted, the quality of the reconstructed signal should not be affected much. This is because the relatively long frame 46 (FIG. 4) can capture sufficient spectral information to compensate for the minor data imperfection.

FIGS. 12 and 13 are schematic drawings which illustrate exemplary hardware implementations of the encoding section 32 and the decoding section 34, respectively, of FIG. 2.

Reference is first directed to the encoding section 32 of FIG. 12. The encoding section 32 can be built or incorporated in various forms, such as a computer, a mobile musical player, a personal digital assistant (PDA), a wireless telephone and so forth, to name just a few.

The encoding section 32 comprises a central data bus 70 linking several circuits together. The circuits include a central processing unit (CPU) or a controller 72, an input buffer 76, and a memory unit 78. In this embodiment, a transmit circuit 74 is also included.

If the encoding section 32 is part of a wireless device, the transmit circuit 74 can be connected to a radio frequency (RF) circuit but is not shown in the drawing. The transmit circuit 74 processes and buffers the data from the data bus 70 before sending out of the circuit section 32. The CPU/controller 72 performs the function of data management of the data bus 70 and further the function of general data processing, including executing the instructional contents of the memory unit 78.

Instead of separately disposed as shown in FIG. 12, as an alternative, the transmit circuit 74 can be parts of the CPU/controller 72.

The input buffer 76 can be tied to other devices (not shown) such as a microphone or an output of a recorder.

The memory unit 78 includes a set of computer-readable instructions generally signified by the reference numeral 77. In this specification and appended claims, the terms "computer-readable instructions" and "computer-readable program code" are used interchangeably. In this embodiment, the instructions include, among other things, portions such as the DCT function 78, the windowing function 80, the FDLP function 82, the quantizer function 84, the entropy coder function 86, and the packetizer function 88.

The various functions have been described, e.g., in the description of the encoding process shown in FIG. 3.

Reference is now directed to the decoding section 34 of FIG. 13. Again, the decoding section 34 can be built in or incorporated in various forms as the encoding section 32 described above.

The decoding section 34 also has a central bus 90 connected to various circuits together, such as a CPU/controller 92, an output buffer 96, and a memory unit 97. Furthermore, a receive circuit 94 can also be included. Again, the receive circuit 94 can be connected to a RF circuit (not shown) if the decoding section 34 is part of a wireless device. The receive circuit 94 processes and buffers the data from the data bus 90 before sending into the circuit section 34. As an alternative, the receive 94 can be parts of the CPU/controller 92, rather than separately disposed as shown. The CPU/controller 92 performs the function of data management of the data bus 90 and further the function of general data processing, including executing the instructional contents of the memory unit 97.

The output buffer 96 can be tied to other devices (not shown) such as a loudspeaker or the input of an amplifier.

The memory unit 97 includes a set of instructions generally signified by the reference numeral 99. In this embodiment, the instructions include, among other things, portions such as the depackertizer function 98, the entropy decoder function 100, the inverse quantizer function 102, the DCT function 104, the synthesis function 106, and the IDCT function 108.

Figure 11:
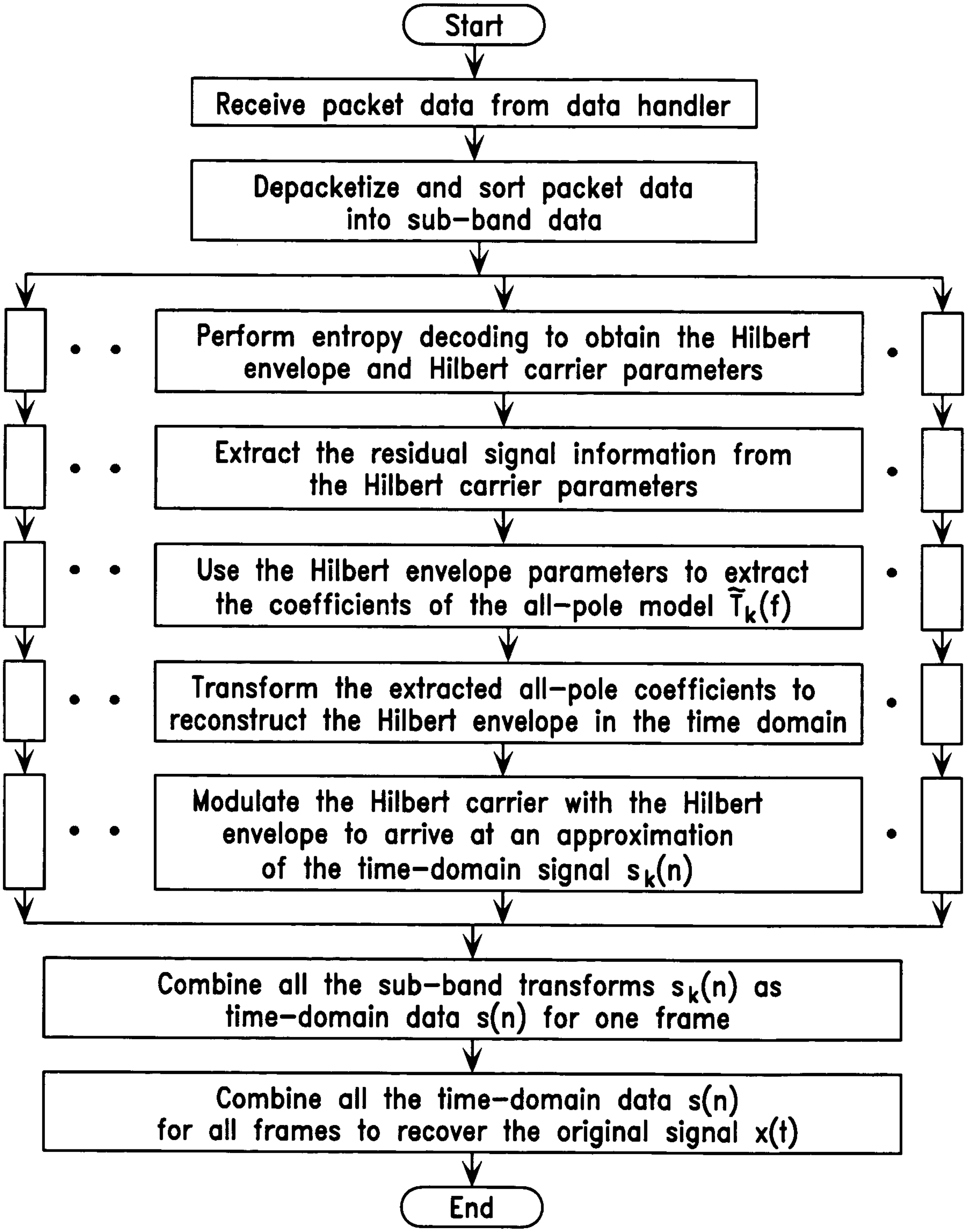
FIG. 11 is flowchart illustrating the steps involved in the decoding process of the exemplified embodiment.

The various functions have been described, e.g., in the description of the encoding process shown in FIG. 11.

It should be noted the encoding and decoding sections 32 and 34 are shown separately in FIGS. 12 and 13, respectively. In some applications, the two sections 32 and 34 are very often implemented together. For instance, in a communication device such as a telephone, both the encoding and decoding sections 32 and 34 need to be installed. As such, certain circuits or units can be commonly shared between the sections. For example, the CPU/controller 72 in the encoding section 32 of FIG. 12 can be the same as the CPU/controller 92 in the decoding section 34 of FIG. 13. Likewise, the central data bus 70 in FIG. 12 can be connected or the same as the central data bus 90 in FIG. 13. Furthermore, all the instructions 77 and 99 for the functions in both the encoding and decoding sections 32 and 34, respectively, can be pooled together and disposed in one memory unit, similar to the memory unit 78 of FIG. 12 or the memory unit 97 of FIG. 13.

In this embodiment, the memory unit 78 or 99 is a RAM (Random Access Memory) circuit. The exemplary instruction portions 78, 80, 82, 84, 86, 88, 98, 100, 102, 104, 106 and 108 are software routines or modules. The memory unit 78 or 97 can be tied to another memory circuit (not shown) which can either be of the volatile or nonvolatile type. As an alternative, the memory unit 78 or 97 can be made of other circuit types, such as an EEPROM (Electrically Erasable Programmable Read Only Memory), an EPROM (Electrical Programmable Read Only Memory), a ROM (Read Only Memory), a magnetic disk, an optical disk, and others well known in the art.

Furthermore, the memory unit 78 or 97 can be an application specific integrated circuit (ASIC). That is, the instructions or codes 77 and 99 for the functions can be hard-wired or implemented by hardware, or a combination thereof. In addition, the instructions 77 and 99 for the functions need not be distinctly classified as hardware or software implemented. The instructions or codes 77 and 97 surely can be implemented in a device as a combination of both software and hardware.

It should be further be noted that the encoding and decoding processes as described and shown in FIGS. 3 and 11 above can also be coded as computer-readable instructions or program code carried on any computer-readable medium known in the art. In this specification and the appended claims, the term "computer-readable medium" refers to any medium that participates in providing instructions to any processor, such as the CPU/controller 72 or 92 respectively shown and described in FIG. 12 or 13, for execution. Such a medium can be of the storage type and may take the form of a volatile or non-volatile storage medium as also described previously, for example, in the description of the memory unit 78 and 97 in FIGS. 12 and 13, respectively. Such a medium can also be of the transmission type and may include a coaxial cable, a copper wire, an optical cable, and the air interface carrying acoustic, electromagnetic or optical waves capable of carrying signals readable by machines or computers. In this specification and the appended claims, signal-carrying waves, unless specifically identified, are collectively called medium waves which include optical, electromagnetic, and acoustic waves.

Finally, other changes are possible within the scope of the invention. In the exemplary embodiment as described, only processing of audio signals is depicted. However, it should be noted that the invention is not so limited. Processing of other types of signals, such as ultra sound signals, are also possible. It also should be noted that the invention can very well be used in a broadcast setting, i.e., signals from one encoder can be sent to a plurality of decoders. Furthermore, the exemplary embodiment as described need not be confined to be used in wireless applications. For instance, a conventional wireline telephone certainly can be installed with the exemplary encoder and decoder as described. In addition, in describing the embodiment, the Levinson-Durbin algorithm is used, other algorithms known in the art for estimating the predictive filter parameters can also be employed. Moreover, the transform operations as described need not involve discrete cosine transforms, other types of transforms, such as various types of non-orthogonal and signal-dependent transforms, are also possible and are well-known in the art. Additionally, any logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. In an encoder, a method for encoding a signal, comprising:
- providing a frequency transform of said signal;
- applying a linear prediction scheme in the frequency domain on said frequency transform to generate a set of values;
- estimating carrier frequency information of said signal; and
- including said set of values and said carrier frequency information as encoded data of said signal.

2. The method as in claim 1 wherein said signal being a portion of a time-varying signal, said method further comprising encoding a plurality of portions of said time-varying signal as said encoded data of said signal.

3. The method as in claim 2 further comprising converting said signal as a discrete signal prior to encoding.

4. The method as in claim 1 further comprising sending said encoded data of said signal through a communication channel.

5. The method as in claim 1 further comprising evaluating the frequency content of said signal and thereafter selecting a portion of said frequency content as said carrier frequency information of said signal.

6. In a decoder, a method for decoding a signal, comprising:
- providing a set of values resulted from a linear prediction scheme in the frequency domain of a frequency transform of said signal;
- transforming said set of values into time-domain values;
- providing carrier frequency information of said signal; and
- including said time-domain values and said carrier frequency information as decoded data of said signal.

7. The method as in claim 6 wherein said signal being a portion of a time-varying signal, said method further comprising decoding a plurality of portions of said time-varying signal as said decoded data of said signal.

8. The method as in claim 7 further comprising converting said decoded data of said signal as a time-varying signal.

9. The method as in claim 6 further comprising receiving said set of values resulted from said linear prediction scheme and said carrier frequency information from a communication channel.

10. The method as in claim 6 further comprising:
- providing a signal carrier from said frequency information;
- providing a signal envelope from said time-domain values; and
- modulating said signal carrier by said signal envelope as a time-varying version of said signal.

11. In a communication system, a method for estimating the signal envelope of a time-varying signal comprising:
- providing a frequency-domain transform of said time-varying signal;
- applying a linear prediction scheme in the frequency domain on said frequency-domain transform to generate a set of parameters; and
- transforming said set of parameters from the frequency-domain to the time-domain as an estimate of said signal envelope of said time-varying signal.

12. The method as in claim 11 wherein said time-varying signal further including a signal carrier, said method further comprising estimating said signal carrier by evaluating the frequency content of said time-varying signal and thereafter selecting a portion of said frequency content as another estimate of said signal carrier of said time-varying signal.

13. An apparatus for encoding a signal, comprising:
- means for providing a frequency transform of said signal;
- means for applying a linear prediction scheme in the frequency domain on said frequency transform to generate a set of values;
- means for estimating carrier frequency information of said signal; and
- means for including said set of values and said carrier frequency information as encoded data of said signal.

14. The apparatus as in claim 13 wherein said signal being a portion of a time-varying signal, said apparatus further comprising means for encoding a plurality of portions of said time-varying signal as said encoded data of said signal.

15. The apparatus as in claim 14 further comprising means for converting said signal as a discrete signal prior to encoding.

16. The apparatus as in claim 13 further comprising means for sending said encoded data of said signal through a communication channel.

17. The apparatus as in claim 13 further comprising means for evaluating the frequency content of said signal and thereafter selecting a portion of said frequency content as said carrier frequency information of said signal.

18. An apparatus for decoding a signal, comprising:

means for providing a set of values resulted from a linear prediction scheme in the frequency domain of a frequency transform of said signal;

means for transforming said set of values into time-domain values;

means for providing carrier frequency information of said signal; and means for including said time-domain values and said carrier frequency information as decoded data of said signal.

19. The apparatus as in claim 18 wherein said signal being a portion of a time-varying signal, said apparatus further comprising means for decoding a plurality of portions of said time-varying signal as said decoded data of said signal.

20. The apparatus as in claim 19 further comprising means for converting said decoded data of said signal as a time-varying signal.

21. The apparatus as in claim 18 further comprising means for receiving said set of values resulted from said linear prediction scheme and said carrier frequency information from a communication channel.

22. The apparatus as in claim 18 further comprising:

means for providing a signal carrier from said frequency information;

means for providing a signal envelope from said time-domain values; and means for modulating said signal carrier by said signal envelope as a time-varying version of said signal.

23. An apparatus for estimating the signal envelope of a time-varying signal comprising:

means for providing a frequency-domain transform of said time-varying signal;

means for applying a linear prediction scheme in the frequency domain on said frequency-domain transform to generate a set of parameters; and means for transforming said set of parameters from the frequency-domain to the time-domain as an estimate of said signal envelope of said time-varying signal.

24. The method as in claim 23 wherein said time-varying signal further including a signal carrier, said apparatus further comprising means for estimating said signal carrier by evaluating the frequency content of said time-varying signal and thereafter selecting a portion of said frequency content as another estimate of said signal carrier of said time-varying signal.

25. An apparatus for encoding a signal, comprising:

an encoder configured to provide a frequency transform of said signal, and apply a linear prediction scheme in the frequency domain on said frequency transform to generate a set of values, and further estimate carrier frequency information of said signal; and a data packetizer connected to said encoder for packetizing said set of values and said carrier frequency information as encoded data of said signal.

26. The apparatus as in claim 25 further comprising a transmit circuit connected to said data packetizer for sending said encoded data through a communication channel.

27. An apparatus for decoding a signal, comprising:

a data depacketizer configured to depacketize a set of values resulted from a linear prediction scheme in the frequency domain of a frequency transform of said signal, and the carrier frequency information of said signal; and;

a decoder connected to said data depacketizer, said decoder being configured to transform said set of values into time-domain values.

28. A non-transitory computer program product, comprising:

a computer-readable medium physically embodied with computer-readable program code for:

providing a frequency transform of said signal;

applying a linear prediction scheme in the frequency domain on said frequency transform to generate a set of values;

estimating carrier frequency information of said signal; and including said set of values and said carrier frequency information as encoded data of said signal.

29. The computer program product as in claim 28 wherein said signal being a portion of a time-varying signal, said computer-readable medium further comprising computer-readable program code for encoding a plurality of portions of said time-varying signal as said encoded data of said signal.

30. The computer program product as in claim 29 wherein said computer-readable medium further comprising computer-readable program code for converting said signal as a discrete signal prior to encoding.

31. The computer program product as in claim 28 wherein said computer-readable medium further comprising computer-readable program code for sending said encoded data of said signal through a communication channel.

32. The computer program product as in claim 29 wherein said computer-readable medium further comprising computer-readable program code for evaluating the frequency content of said signal and thereafter selecting a portion of said frequency content as said carrier frequency information of said signal.

33. The computer program product as in claim 32 wherein said computer-readable medium further comprising computer-readable program code for receiving said set of values resulted from said linear prediction scheme and said carrier frequency information from a communication channel.

34. The computer program product as in claim 32 wherein said computer-readable medium further comprising computer-readable program code for:

providing a signal carrier from said frequency information;

providing a signal envelope from said time-domain values; and modulating said signal carrier by said signal envelope as a time-varying version of said signal.

35. A non-transitory computer program product, comprising:

a computer-readable medium physically embodied with computer-readable program code for:

providing a set of values resulted from a linear prediction scheme in the frequency domain of a frequency transform of said signal;

transforming said set of values into time-domain values;

providing carrier frequency information of said signal; and including said time-domain values and said carrier frequency information as decoded data of said signal.

36. The computer program product as in claim 35 wherein said signal being a portion of a time-varying signal, said computer-readable medium further comprising computer-readable program code for decoding a plurality of portions of said time-varying signal as said decoded data of said signal.

37. The computer program product as in claim 36 wherein said computer-readable medium further comprising computer-readable program code for converting said decoded data of said signal as a time-varying signal.

38. A non-transitory computer program product for estimating the signal envelope of a time-varying signal, comprising:

a computer-readable medium physically embodied with computer-readable program code for:

providing a frequency-domain transform of said time-varying signal;

applying a linear prediction scheme in the frequency domain on said frequency-domain transform to generate a set of parameters; and transforming said set of parameters from the frequency-domain to the time-domain as an estimate of said signal envelope of said time-varying signal.

39. The computer program product as in claim 38 wherein said time-varying signal further including a signal carrier, said computer-readable medium further comprising computer-readable program code for estimating said signal carrier by evaluating the frequency content of said time-varying signal and thereafter selecting a portion of said frequency content as another estimate of said signal carrier of said time-varying signal.

* * * * *